US010718541B2

(12) United States Patent
Chakravarty et al.

(10) Patent No.: US 10,718,541 B2
(45) Date of Patent: Jul. 21, 2020

(54) MULTI-THERMOSTAT MANAGEMENT AND CONTROL SYSTEM

(71) Applicant: Emerson Electric Co., St. Louis, MO (US)

(72) Inventors: Abhishek Chakravarty, St. Louis, MO (US); Stephen E. Bolen, St. Louis, MO (US); Kathleen Dye, St. Charles, MO (US)

(73) Assignee: Emerson Electric Co., St. Louis, MO (US)

( * ) Notice: Subject to any disclaimer, the term of this patent is extended or adjusted under 35 U.S.C. 154(b) by 148 days.

(21) Appl. No.: 15/226,536

(22) Filed: Aug. 2, 2016

(65) Prior Publication Data

US 2018/0038606 A1   Feb. 8, 2018

(51) Int. Cl.
| | | |
|---|---|---|
| *G05B 15/02* | (2006.01) | |
| *F24F 11/52* | (2018.01) | |
| *F24F 11/54* | (2018.01) | |
| *F24F 11/58* | (2018.01) | |
| *F24F 11/62* | (2018.01) | |
| *F24F 11/30* | (2018.01) | |
| *G05D 23/19* | (2006.01) | |

(Continued)

(52) U.S. Cl.
CPC .............. *F24F 11/62* (2018.01); *F24F 11/30* (2018.01); *F24F 11/52* (2018.01); *G05B 15/02* (2013.01); *G05D 23/1905* (2013.01); *F24F 11/54* (2018.01); *F24F 11/58* (2018.01); *F24F 2110/00* (2018.01); *F24F 2120/20* (2018.01); *G05B 2219/2642* (2013.01)

(58) Field of Classification Search
None
See application file for complete search history.

(56) References Cited

U.S. PATENT DOCUMENTS 7,436,293 B2   10/2008   Rourke et al.
7,702,421 B2    4/2010   Sullivan et al.
(Continued)

OTHER PUBLICATIONS

User Manual, JENEsys snap! Lynxspring, Inc, 2008, retrieved from the internet: <https://alpscontrols.com/prod_data/pdfs/LYNXSPRING/snap%20User%20Guide.pdf> (Year: 2008).*

*Primary Examiner* — Kenneth M Lo
*Assistant Examiner* — Istiaque Ahmed
(74) *Attorney, Agent, or Firm* — Armstrong Teasdale LLP

(57) ABSTRACT

A control system for managing operation of a plurality of thermostats includes a server comprising a processor, a memory, and a communication interface. The memory device stores instructions that when executed by the processor cause the processor to display, on a display device of a computing device, a visual representation for each thermostat of the plurality of thermostats and one or more groups into which each of the plurality of thermostats is grouped, and further to assign an operating schedule to a group, apply the assigned operating schedule to each thermostat of the plurality of thermostats located in the group, and move one thermostat of the plurality of thermostats from a first group to a second group in response to a user dragging and dropping a visual representation of the thermostat on the display device from the first group to the second group.

14 Claims, 19 Drawing Sheets

(51) Int. Cl.
  *F24F 120/20*  (2018.01)
  *F24F 110/00*  (2018.01)

(56) References Cited

U.S. PATENT DOCUMENTS

| | | | |
|---|---|---|---|
| 2005/0097162 A1* | 5/2005 | Budike, Jr. | H04L 29/06 |
| | | | 709/201 |
| 2009/0055760 A1 | 2/2009 | Whatcott et al. | |
| 2013/0067412 A1 | 3/2013 | Leonard et al. | |
| 2015/0057814 A1* | 2/2015 | Mighdoll | G05D 23/1902 |
| | | | 700/278 |
| 2015/0134124 A1* | 5/2015 | Carter | G05D 23/1923 |
| | | | 700/278 |
| 2015/0312995 A1* | 10/2015 | Bora | H05B 33/0863 |
| | | | 315/34 |
| 2016/0043962 A1 | 2/2016 | Kim et al. | |
| 2018/0129232 A1* | 5/2018 | Hriljac | G05D 23/1904 |

\* cited by examiner

MULTI-THERMOSTAT MANAGEMENT AND CONTROL SYSTEM

FIELD

The field of the disclosure relates generally to controlling thermostats, and more particularly, to systems and methods for managing, programming, and controlling a plurality of thermostats using groups and schedules in a user-friendly display interface.

BACKGROUND

Controlling multiple thermostats can be streamlined by thermostat grouping. However, current web-based systems that allow grouping of multiple thermostats are difficult to operate and are not user friendly. Additionally, in systems that allow grouping, it is cumbersome to edit thermostat groups or move a thermostat from one group to another when desired or required.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

According to one aspect of this disclosure, a method performed by a server for managing a plurality of thermostats associated with an account includes displaying, on a display device of a computing device, a visual representation for each one of the plurality of thermostats associated with the account and creating a group in response to an input from a user on an input device. The method further includes adding one of the plurality of thermostats to the group in response to the user dragging and dropping the visual representation of one the plurality of thermostats into a visual representation of the group, assigning an operating schedule to the group, and responsive to the assigning, applying the operating schedule to the thermostat in the group.

Another aspect of this disclosure is a method of managing a plurality of thermostats associated with an account that includes displaying, on a display device, a plurality of groups, each group containing at least one visual representation of one of the plurality of thermostats, each group having an assigned operating schedule such that the operating schedule assigned to the group is applied to each one of the plurality of thermostats within the group. The method further includes communicating with each of the plurality of thermostats and displaying thermostat data in association with the visual representation of the thermostat, moving one of the plurality of thermostats from a source group to a destination group in response to a user dragging and dropping the visual representation of the thermostat on the display device from the source group to the destination group; assigning an operating schedule to the group; and responsive to the assigning, applying the operating schedule to the thermostat in the group.

Still another aspect of this disclosure is a control system for controlling operation of a plurality of thermostats including a server comprising a processor, a memory, and a communication interface. The memory device stores instructions that when executed by the processor cause the processor to display, on a display device of a computing device, a visual representation of each of the plurality of thermostats and one or more groups into which each of the plurality of thermostats is grouped.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

The embodiments described herein generally relate to controlling multiple thermostats, and more particularly, to systems and methods for user friendly management and grouping of multiple thermostats associated with a user account.

Figure 1:
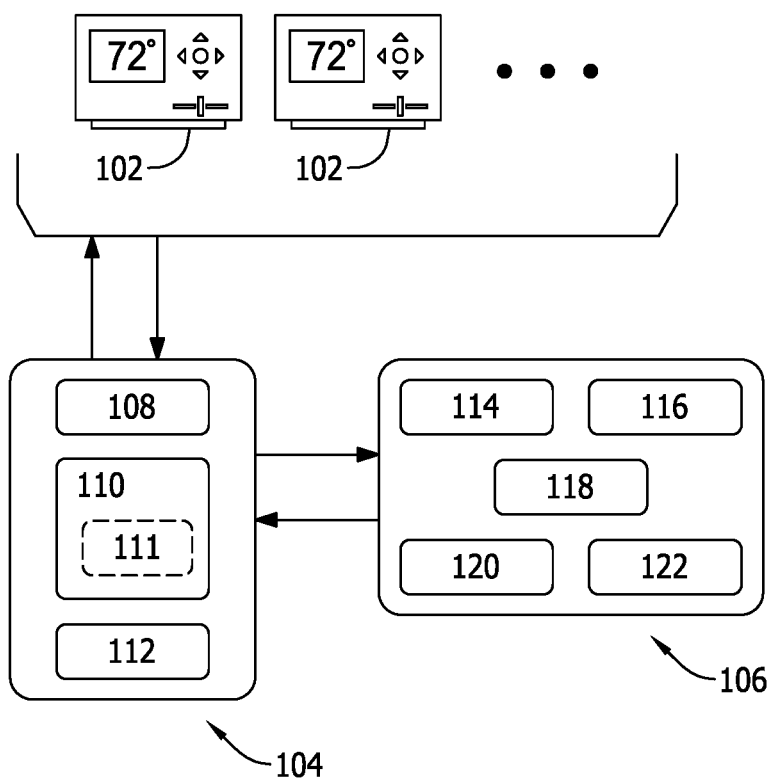
FIG. 1 is an illustration of an example thermostat control system.

An example of a thermostat control system of this disclosure is indicated generally in FIG. 1 by reference number 100. In this example, the thermostat control system 100 includes a server 104 in communication with a plurality of thermostats 102 and with a computing device 106. Server 104 includes a processor 108, a memory device 110, and a communication interface 112. Server 104 may include, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein.

Memory device 110 contains information 111 regarding user accounts and the plurality of thermostats 102 associated with each account.

Figure 2:
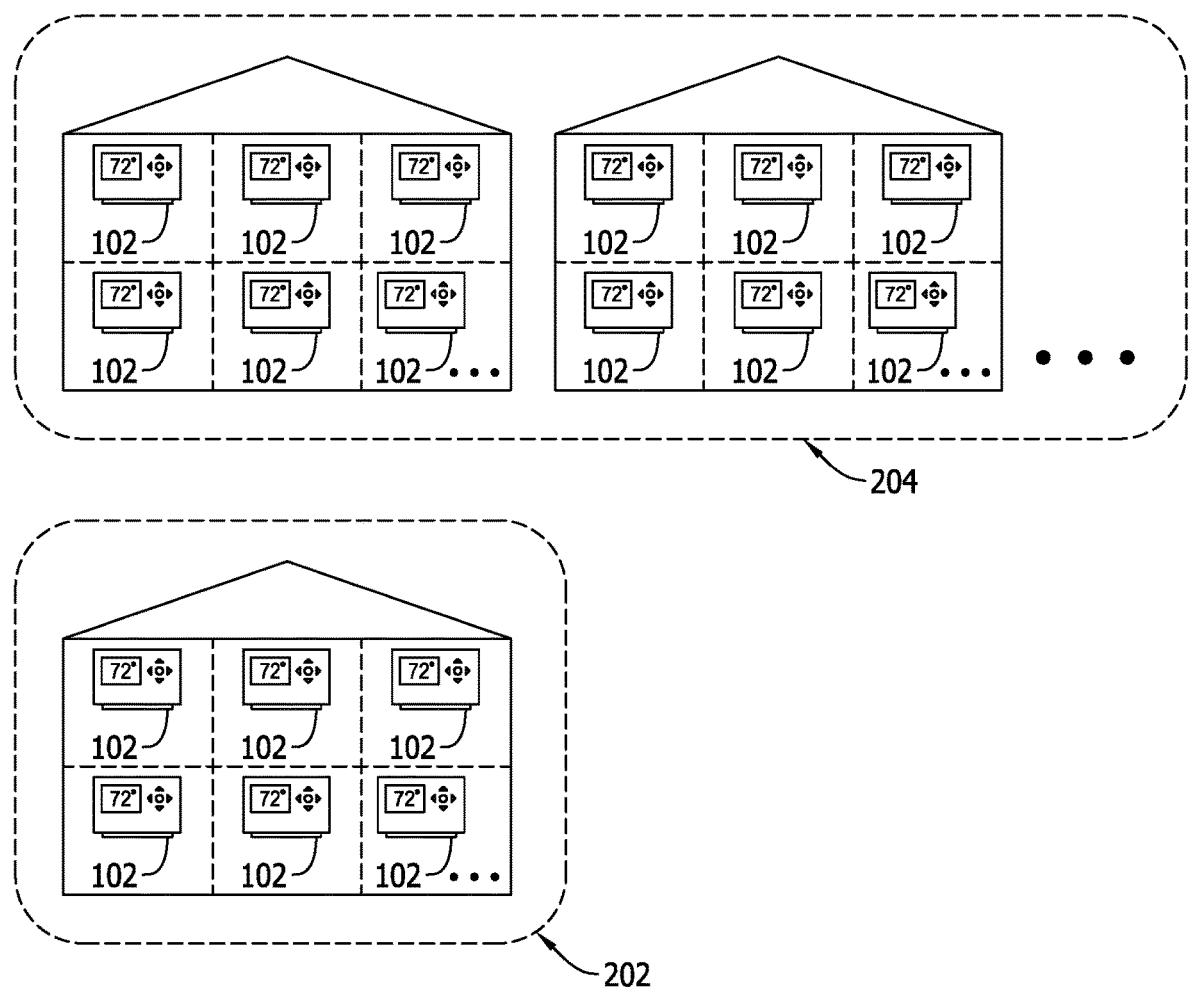
FIG. 2 is a block diagram of a portion of a control system for use in the thermostat control system shown in FIG. 1.

FIG. 2 is a block diagram of a portion of a control system for use in the thermostat control system 100 shown in FIG. 1. The plurality of thermostats 102 associated with an account may be housed in a single building 202 or may be distributed over several buildings 204. In cases where the plurality of thermostats 102 is distributed over several buildings, some buildings may be in close proximity to one another, such as several buildings located on a college campus. Additionally or alternatively, buildings housing the plurality of thermostats 102 may be remotely located from one another, such as located in different neighborhoods of the same city, in different cities, in different states, in different countries, or the like. For example, the plurality of thermostats 102 associated with an account may be associated with a school, university, daycare, church, place of worship, non-profit organization, property management company, restaurant, coffee shop, bars, bank, credit union, or the like, that may have a building with several thermostats, several buildings, and/or several locations.

Computing device 106 shown in FIG. 1 includes a processor 114, a memory device 116, a communication interface 118, a user interface 120, and a display device 122. Memory device 110 of server 104 stores instructions that when executed by the processor 108 cause the processor 108 to display visual representations of the plurality of thermostats 102, as well as groups and operating schedules and other views according to embodiments described herein, on the display device 122 of the computing device 106. Computing device 106 may include any computing device configured to function as described herein, including a smartphone, a tablet, a phablet, a laptop computer, a desktop computer, a dedicated computing device associated solely with the control system 100, and/or any other computing device.

The methods described herein may be encoded as executable instructions embodied in a computer-readable medium including, without limitation, a storage device and/or a memory device. Such instructions, when executed by a processor, cause the processor to perform at least a portion of the methods described herein. The memory device can include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage.

Figure 3:
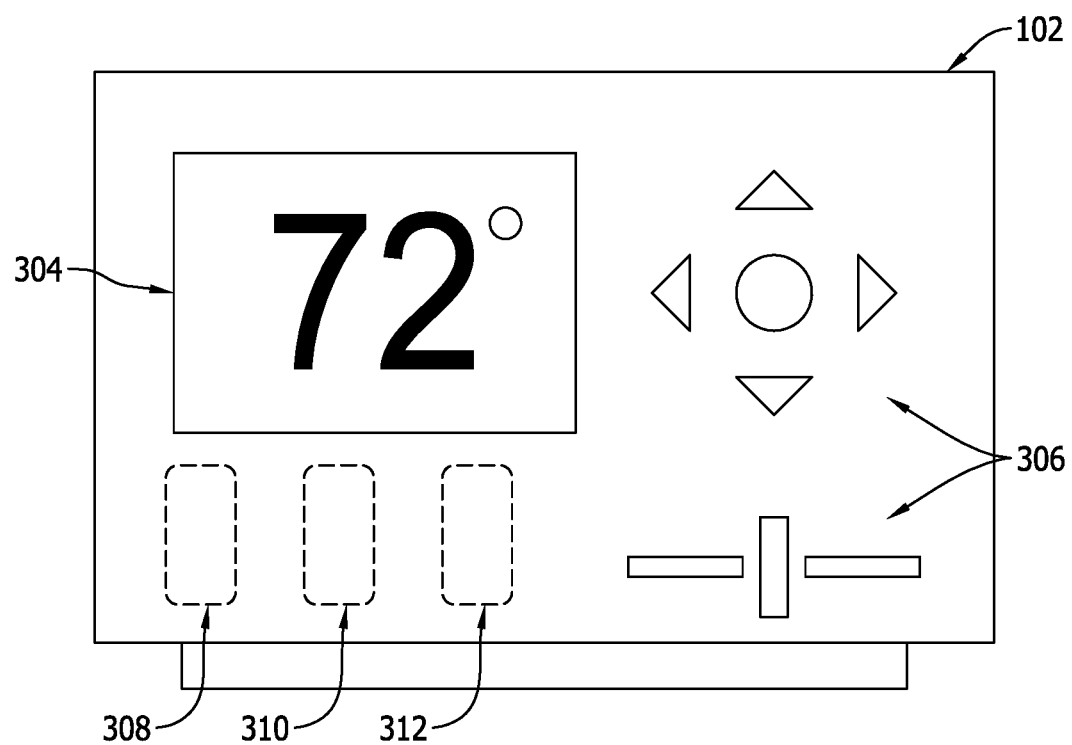
FIG. 3 is a block diagram of a thermostat for use in the system shown in FIG. 1.

FIG. 3 is a block diagram of a thermostat 102 for use in the control system 100 shown in FIG. 1. The thermostat 102 may include and/or be embodied in a computing device. Thermostat 102 includes a display device 304, a user interface 306, a processor 308, a memory device 310, and a communication interface 312. Each thermostat 102 is capable of sensing temperature at its location and communicating the temperature to the server 104. In some embodiments, one or more additional elements of thermostat data, such as humidity, temperature at a second location, operating status, fan speed, and the like, is transmitted by the thermostats 102 to the server 104. Thermostat 102 is also capable of storing a heating operating schedule and a cooling operating schedule. In preferred embodiments, operating schedules are transmitted from server 104 to each thermostat 102. Thermostat 102 is further capable of responsively initiating operation of a heating or cooling operating schedule when a sensed temperature is more than a predetermined amount above or below a set point temperature, as designated in the schedule.

Server 104, thermostats 102, and computing device 106 may include one or more communication interfaces (112, 312, and 118 respectively) allowing them to communicate with each other as well as remote devices and systems, such as sensors, valve control systems, safety systems, remote computing devices, and the like. The communication interfaces may be wired or wireless communications interfaces that permit the computing device to communicate with the remote devices and systems directly or via a network. Wireless communication interfaces may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired communication interfaces may use any suitable wired communication protocol for direct communication including, without limitation, USB, RS232, I2C, SPI, analog, and proprietary I/O protocols. Moreover, in some embodiments, the wired communication interfaces include a wired network adapter allowing the computing device to be coupled to a network, such as the Internet, a local area network (LAN), a wide area network (WAN), a mesh network, and/or any other network to communicate with remote devices and systems via the network.

Figure 4:
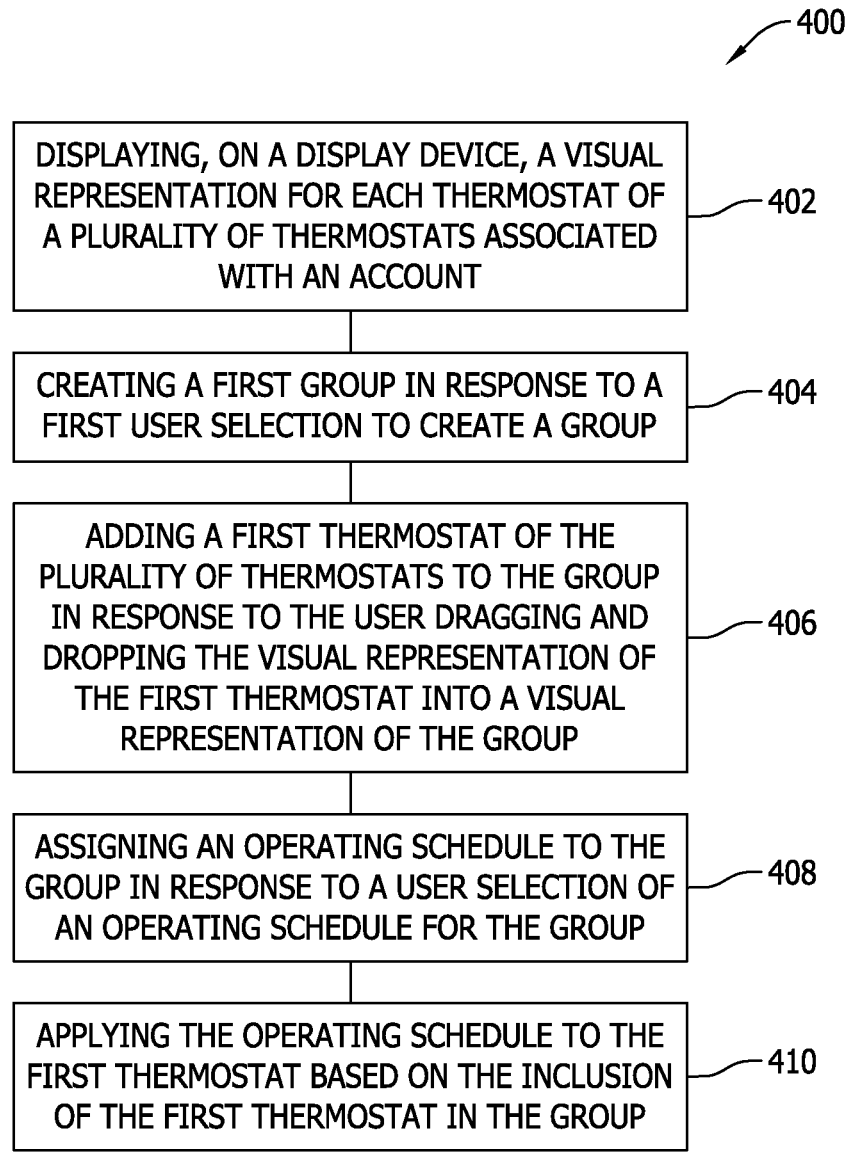
FIG. 4 is a flow diagram of a method of setting-up of the system shown in FIG. 1.

FIG. 4 is a flow diagram of a method 400 of setting-up of the control system shown in FIG. 1. In this embodiment, a method of managing a plurality of thermostats includes displaying 402, on a display device, a visual representation for each thermostat of a plurality of thermostats associated with an account. The method also includes creating 404 a first group in response to a first user selection to create a group and adding 406 a first thermostat of the plurality of thermostats to the group in response to the user dragging and dropping the visual representation of the first thermostat into a visual representation of the group. The method further includes assigning 408 an operating schedule to the group in response to a user selection of an operating schedule for the group and applying 410 the operating schedule to the first thermostat based on the inclusion of the first thermostat in the group. Although the groups described in this method are schedule groups, groups can include location groups (in which thermostats are grouped by common geographic location rather without necessarily including a schedule), feature groups (in which thermostats are grouped by a common feature or features), and/or any other suitable types of groups. Moreover, in some embodiments, thermostats may belong to more than one group, such as a schedule group and a location group.

In some embodiments, the method 400 further includes transmitting the operating schedule over a network to the first thermostat for reprogramming and storing in a memory of the first thermostat. Method 300 additionally includes creating a second group in response to a second user selection to create a group, adding a second thermostat of the plurality of thermostats to the second group in response to the user dragging and dropping the visual representation of the second thermostat into the visual representation of the second group. The method may also include assigning a second operating schedule to the second group in response to a user selection of a second operating schedule for the second group, applying the second operating schedule to the second thermostat based on the inclusion of the second thermostat in the second group, and transmitting the second operating schedule over a network to the second thermostat for reprogramming and storing in a memory of the second thermostat.

Figure 5:
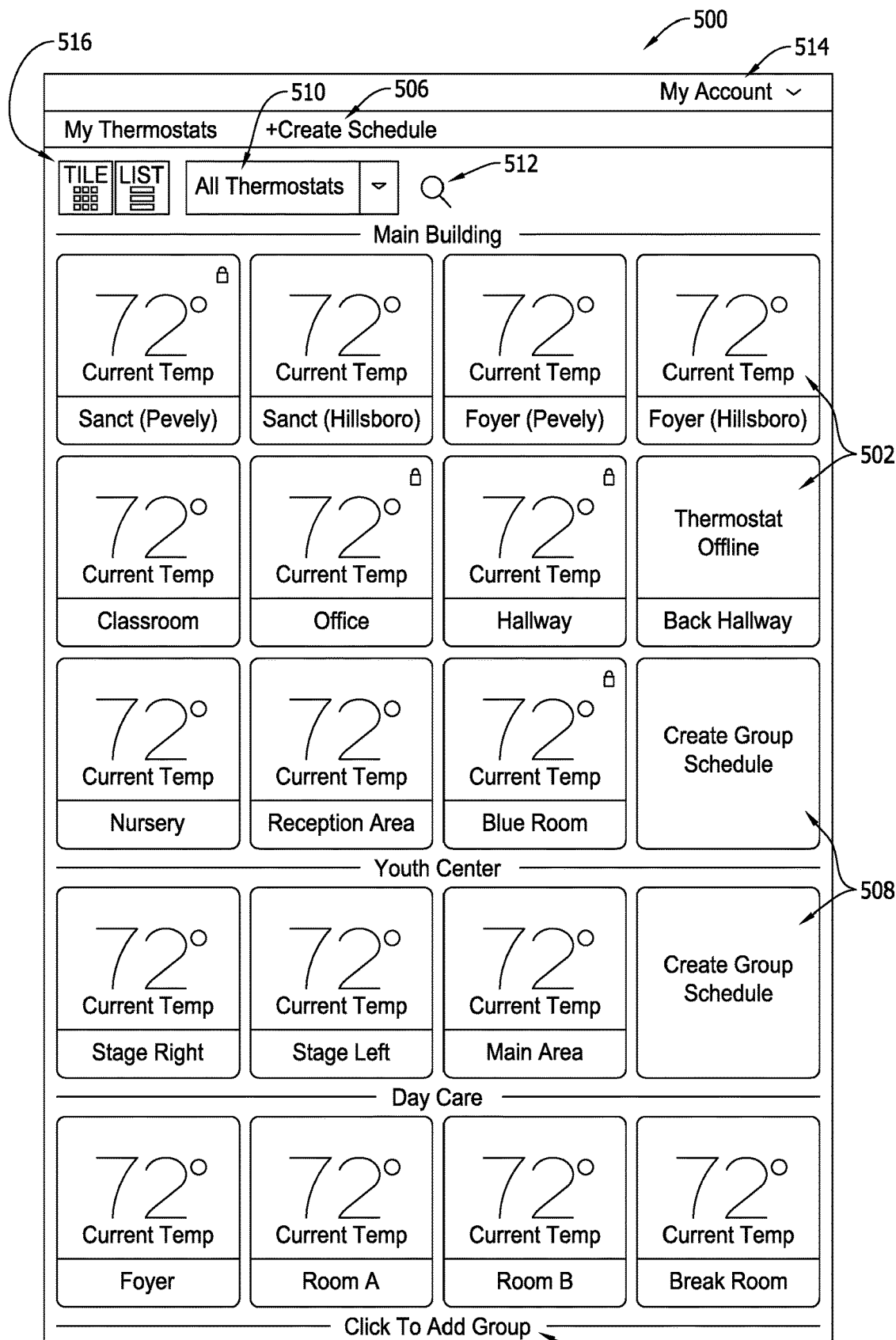
FIG. 5 is a card view dashboard.
Figure 6:
FIG. 6 is a list view dashboard.

Displaying 502 a visual representation for each thermostat of the plurality of thermostats may include, for example, displaying a list item, a card icon, or other suitable visual representation. FIGS. 5 and 6 respectively show a card view dashboard 500 and a list view dashboard 600 according to preferred embodiments.

FIG. 5 is a card view dashboard 500. A card icon 502 is shown for each thermostat and sorted according to group. For example, FIG. 5 shows three groups: a Main Building group, a Youth Center group, and a Day Care group. In some embodiments, card icons 502 are color-coded according to one of a heating schedule assignment (shown as red card), a cooling schedule assignment (shown as blue card), an un-scheduled assignment (shown as grey card), or an offline designation (shown as black card). Each thermostat card icon is visible at all times, even if it is not displaying thermostat data, as will be discussed in greater detail below. A user can create a new group by selecting Add Group 504. The user can also modify group names and delete groups as needed. Selection of Create Schedule 506 allows the user to create a new schedule that is not yet assigned to a group. Once the new schedule is created, the user may assign the schedule to a group, and accordingly the schedule is applied to each thermostat in the group. Alternatively, selection of Create Group Schedule 508 allows the user to create a new schedule for all thermostats in the group. Drop down menu 510 allows for sorting by group and for quick viewing of any previously created group. Search bar 512 allows a user to search by thermostat name or group. In some embodiments, selection of search bar 512 may cause the search bar 512 to expand or pop out for the user to begin typing to search by name or group. Thermostats found as the result of a search are displayed at the top of the card view and remain in groups. Account drop down menu 514 allows a user to view account-related information and links. Toggle button 516 allows a user to switch between the card view of FIG. 5 and the list view of FIG. 6.

With respect to the list view dashboard 600 of FIG. 6, all thermostats with a group are displayed as list items 602. Groups can be expanded to display all thermostats or collapsed to display group names only. Similar to the card view dashboard 500, the list view dashboard 600 also includes toggle button, drop down menu, search bar, account drop down menu, and create schedule features.

Figure 7:
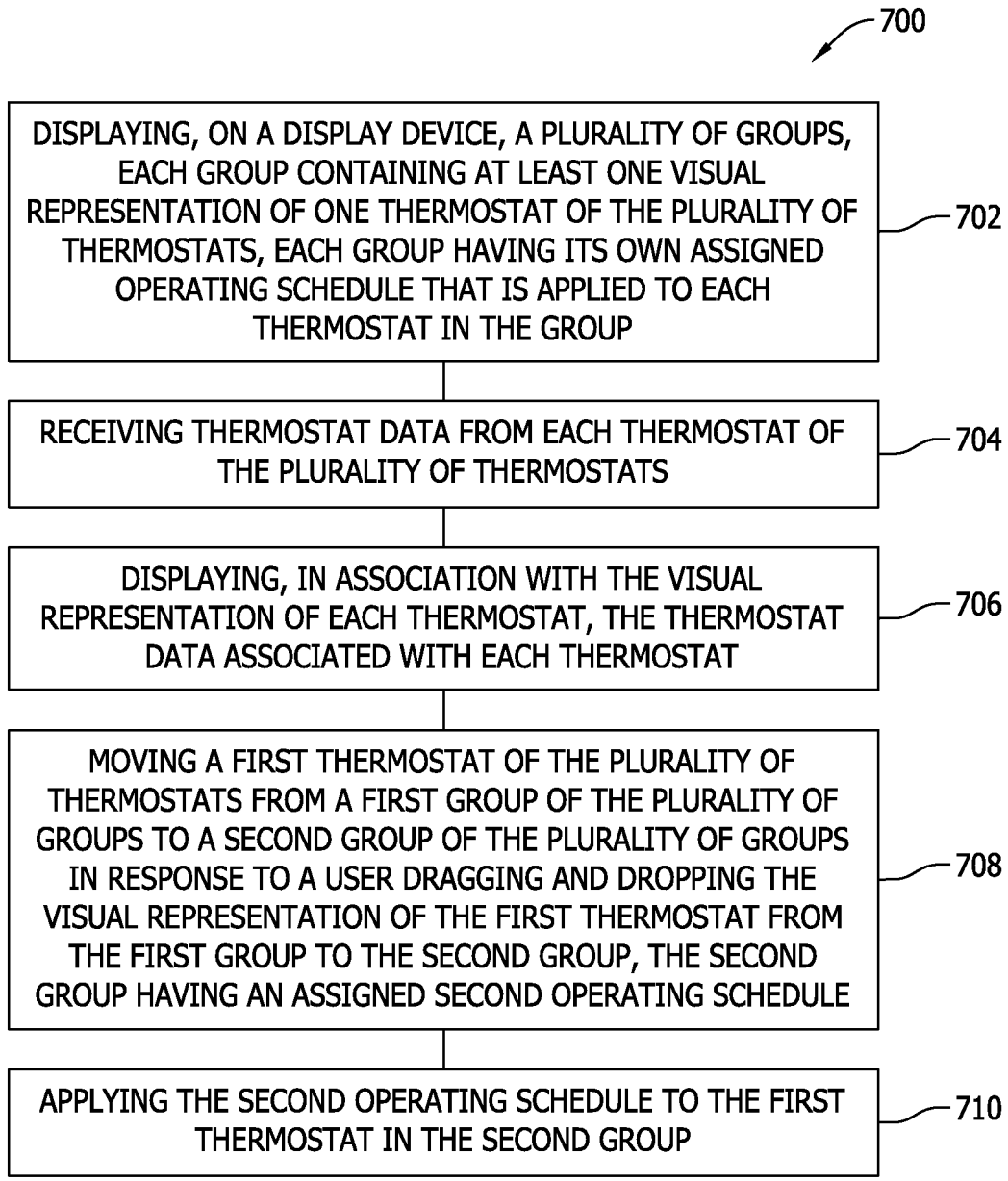
FIG. 7 is a flow diagram of a method of operation of the system shown in FIG. 1.

FIG. 7 is a flow diagram of a method 700 of operation of the control system shown in FIG. 1. In this embodiment, a method of managing a plurality of thermostats includes displaying 702, on a display device, a plurality of groups, each group containing at least one visual representation of one thermostat of the plurality of thermostats, and each group having its own assigned operating schedule that is applied to each thermostat within the group. The method also includes receiving 704 thermostat data from each thermostat of the plurality of thermostats and displaying 706, in association with the visual representation of each thermostat, the thermostat data associated with each thermostat. The method further includes moving 708 a first thermostat of the plurality of thermostats from a first group of the plurality of groups to a second group of the plurality of groups in response to a user dragging and dropping the visual representation of the first thermostat from the first group to the second group, the second group having an assigned second operating schedule, and applying 710 the second operating schedule to the first thermostat in the second group.

Figure 8:
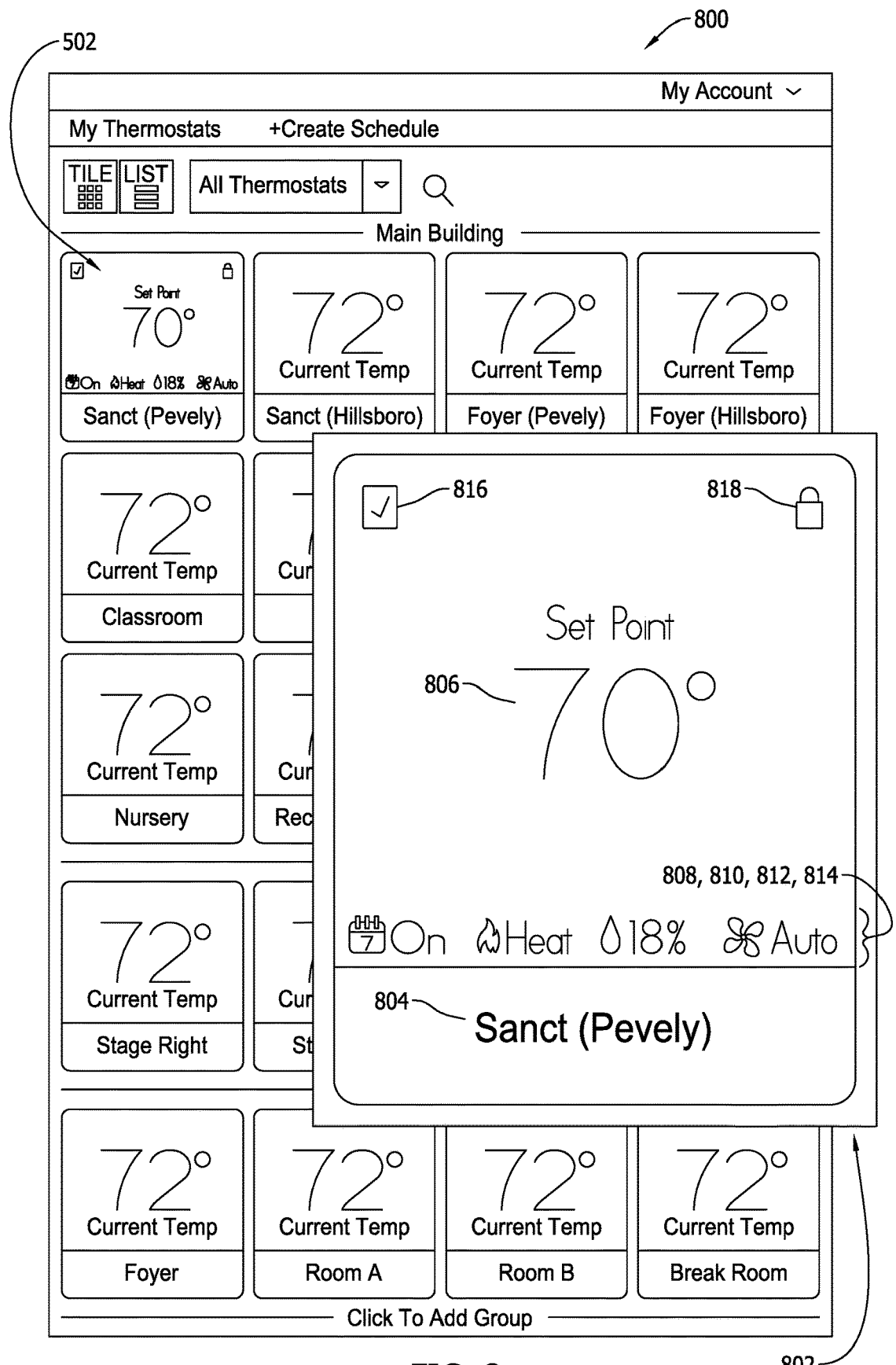
FIG. 8 is a rollover card state of a dashboard.

FIG. 8 is a rollover card state 800 of a dashboard according to embodiments of the present disclosure. When a user wishes to view additional information associated with a particular thermostat 102, the user can hover over or rollover (e.g., with a computer mouse and without selecting or clicking on) the corresponding card icon 502. In the rollover state, depending on the embodiment, rollover card icon 802 displays at least one of a name of the thermostat 804, a set-point of the thermostat 806, a current temperature (not shown), an on/off schedule status 808, a type of operating schedule assigned to the thermostat 810, a percent humidity 812, a fan mode 814, a check-box 816, and a lock icon 818. The check-box 816 indicates a selected or deselected status when managing the plurality of thermostats of the control system 100. Presence of the lock icon 818 indicates a keypad lockout for that thermostat. For example, the presence of lock icon 818 indicates that no changes to the thermostat can be made via the user interface 306 of the thermostat. Fan modes 814 include on, off, and auto modes.

Figure 9:
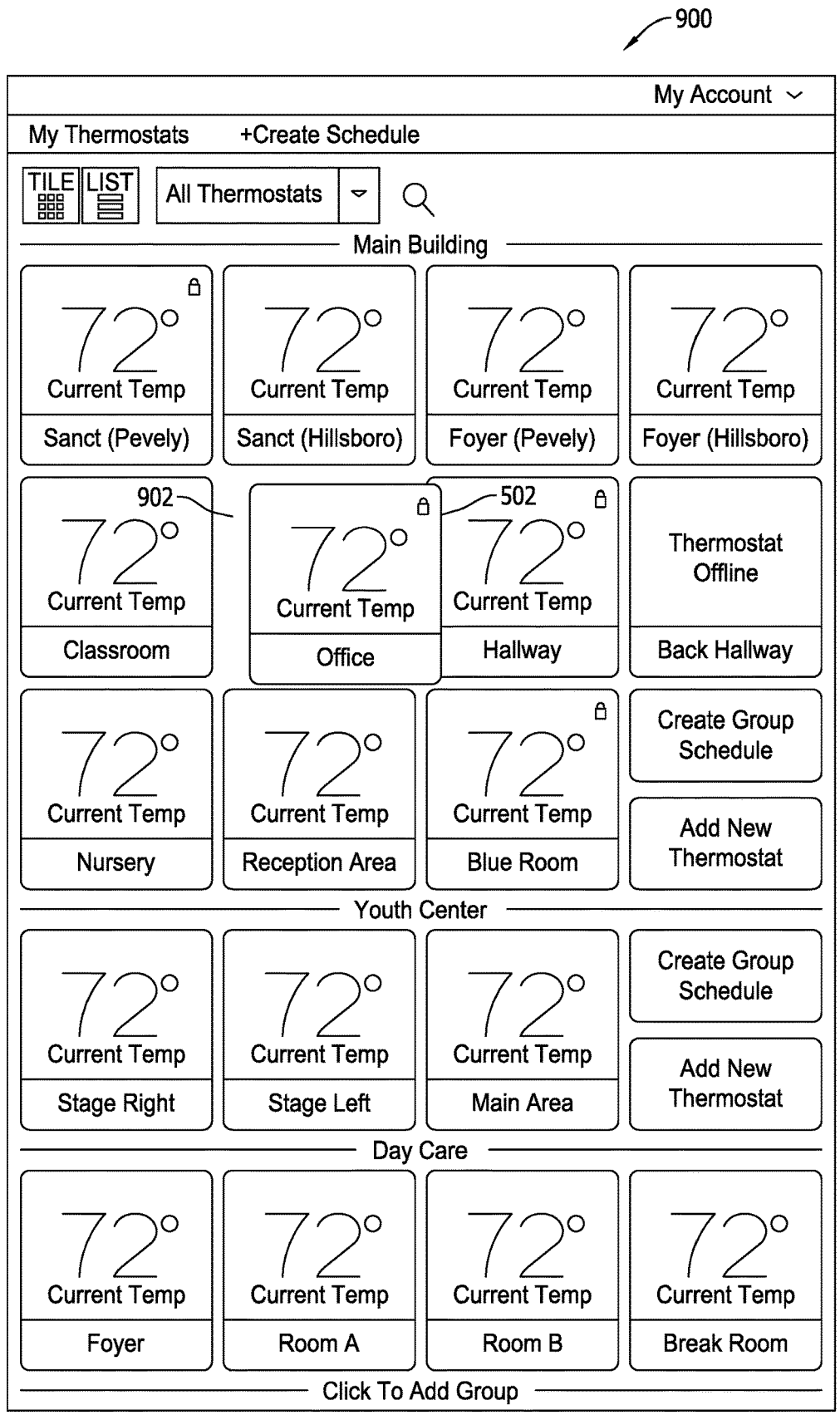
FIG. 9 is a drag and drop card view of a dashboard.

FIG. 9 is a drag and drop card view 900 of a dashboard. Card icons 502 can be dragged and dropped from one group to another, or moved within a group according to user preference. In some embodiments, a shadow 902 is displayed around the card icon 502 to indicate that the card is being dragged and has not yet been dropped into a group. In some embodiments, when a selected card icon 502 is hovered over a location, non-selected card icons at that location will slide over and make a space indicating to the user exactly where the drop location would be.

Figure 10A:
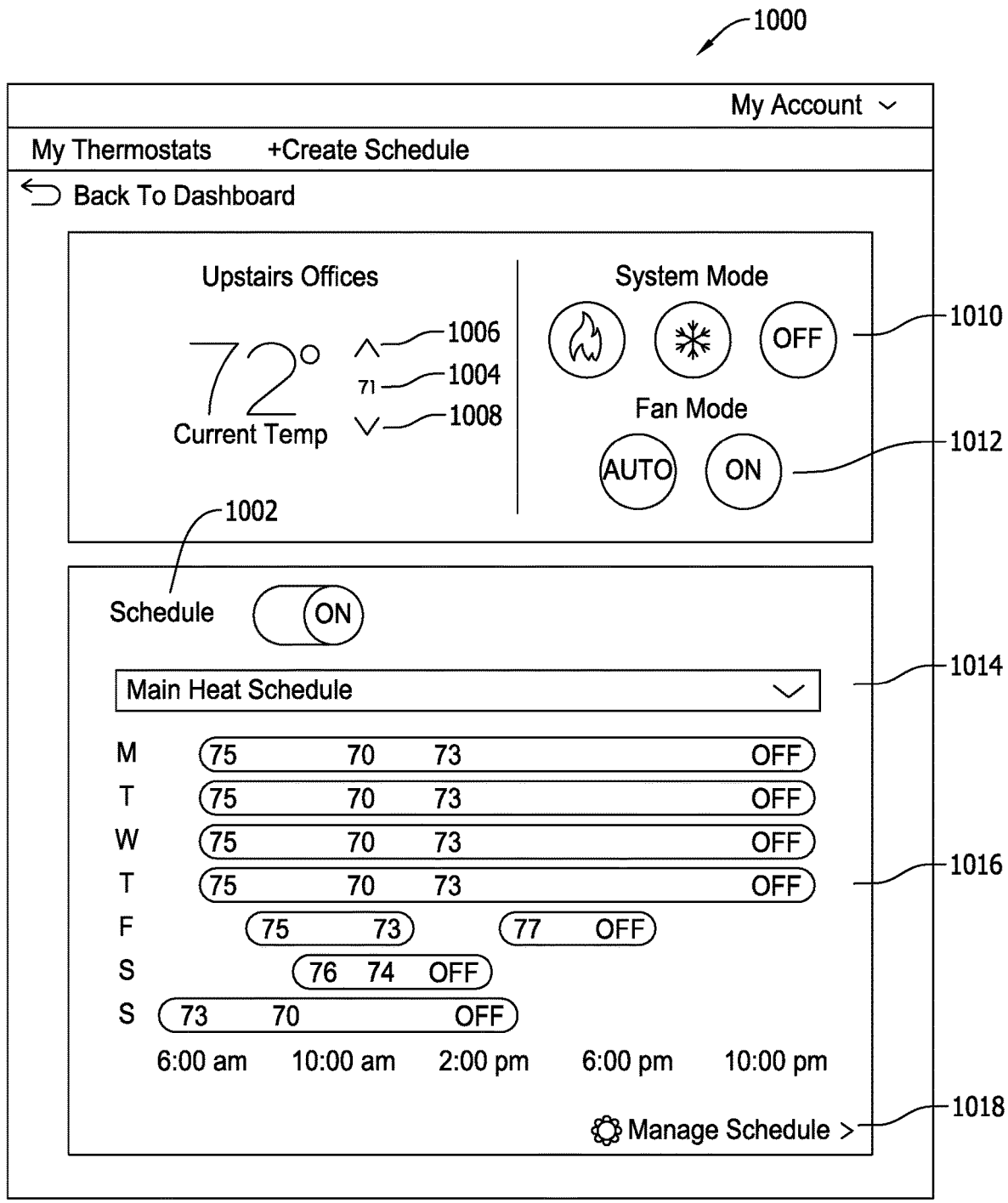
FIGS. 10a and 10b are thermostat detail views.
Figure 10B:
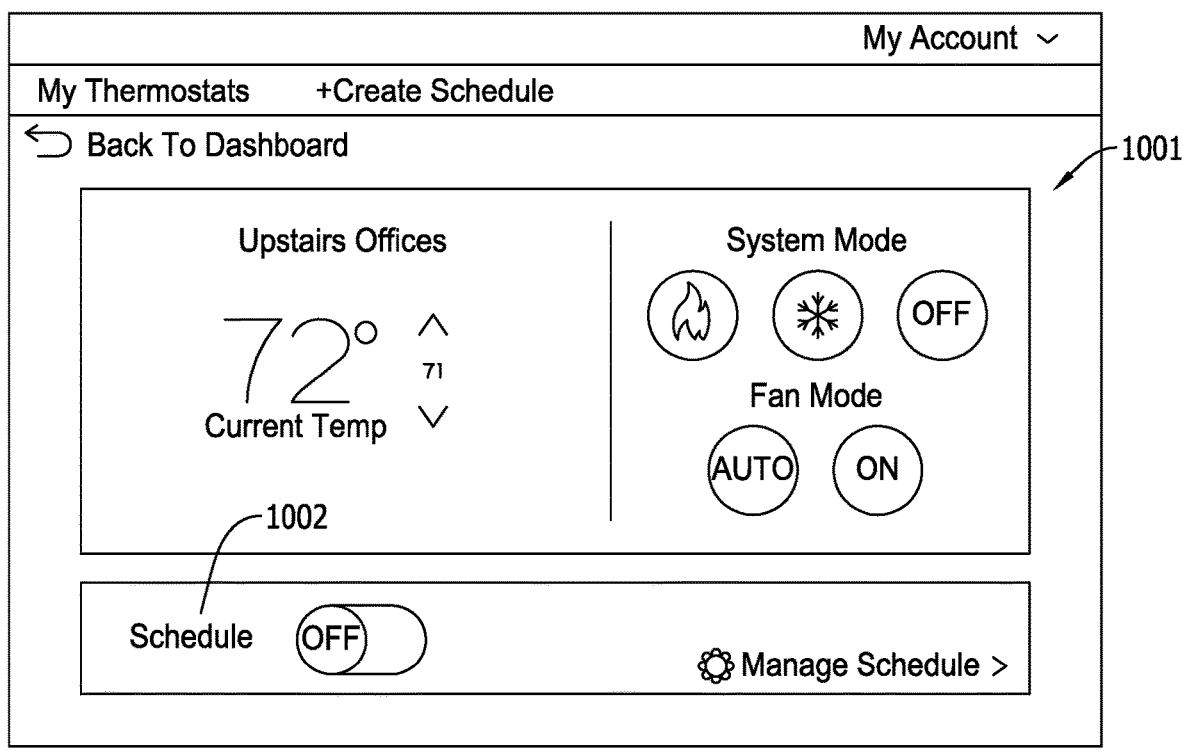

FIGS. 10*a* and 10*b* are thermostat detail views, which are displayed in response to a user selecting (e.g., with a mouse click) a card icon 502 that corresponds to a thermostat 102. FIG. 10*a* shows a thermostat detail view 1000 for which the operating schedule is turned on, as indicated by schedule on/off button 1002. In the thermostat detail view, a user can manage and control various settings associated with the thermostat. The user can change a current set point 1004 by selecting increase set point button 1006 or decrease set point button 1008. A system mode 1010 can be selected from heating, cooling, or off modes. A fan mode 1012 can be selected from auto or off modes. The name of the currently-applied operating schedule is shown at 1014.

In some embodiments, schedule name 1014 is also a drop down menu from which the user can choose a different operating schedule to apply to the thermostat. When a user selects a different operating schedule, the settings of the different operating schedule are applied to the thermostat and reflected in the thermostat detail view 1000, including the seven day schedule 1016. When the operating schedule is turned on at button 1002, a thermostat can have one heating operating schedule and one cooling operating schedule applied to it at any given time. For example, when a user selects to change the system mode 1010 from cooling to heating mode, the applied cooling schedule is deactivated and the applied heating schedule is activated. The thermostat detail view 1000 is also updated to reflect set point 1004, system mode 1010, fan mode 1012, schedule name 1014, and seven day schedule 1016. Manage schedules button 1018, when selected, displays a schedule bank view of a dashboard. Manage schedules button 1018 allows a user to edit all schedules, as discussed below in reference to FIG. 11.

FIG. 10b is a thermostat detail view 1001 in which the operating schedule is turned off, as indicated by schedule on/off button 1002. When the operating schedule is turned off, the set point, system mode, and fan mode can be changed, as shown in FIG. 10a.

Figure 11:
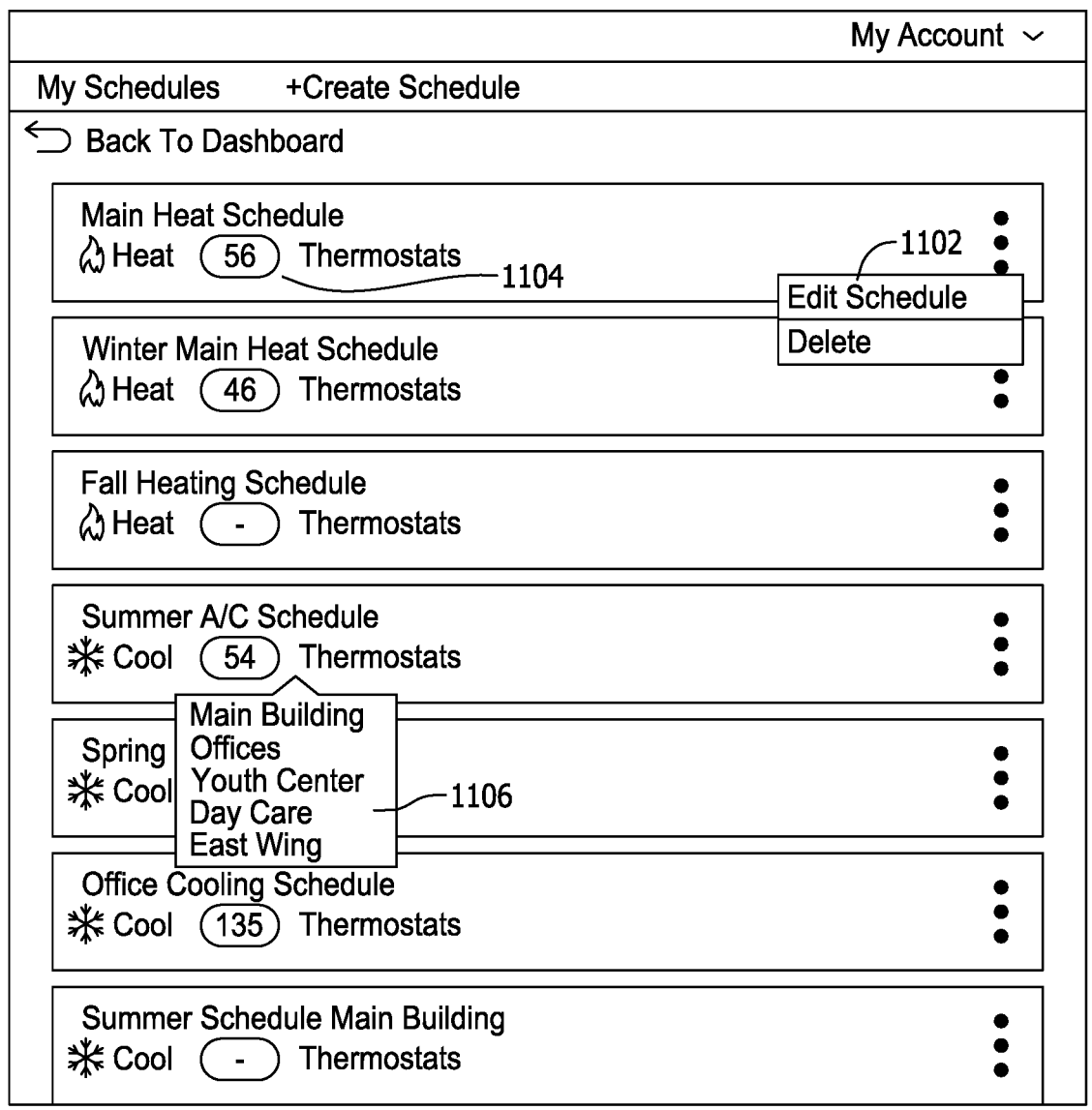
FIG. 11 is a schedule bank view of a dashboard.

FIG. 11 is a schedule bank view 1100 of a dashboard, from which a user can manage operating schedules using option button 1102 to edit or delete. When a schedule is deleted, the thermostats assigned to that schedule have their scheduling turned off and they revert to a 'schedule off' mode (effectively turning the thermostat into a 'non programmable' thermostat). The schedule bank view 1100 lists all heating and cooling schedules. The schedule bank view 1100 may list, for example, all schedules created by the user according to method 400. The schedule bank view 1100 displays a list of schedules by name and indicates whether the schedule is a heating or cooling schedule. In addition, a number of thermostats 1104 is shown to indicate how many thermostats have this operating schedule. The number of thermostats 1104 can be selected to display a drop down list 1106 of the group names and thermostat names that have this operating schedule.

Figure 12:
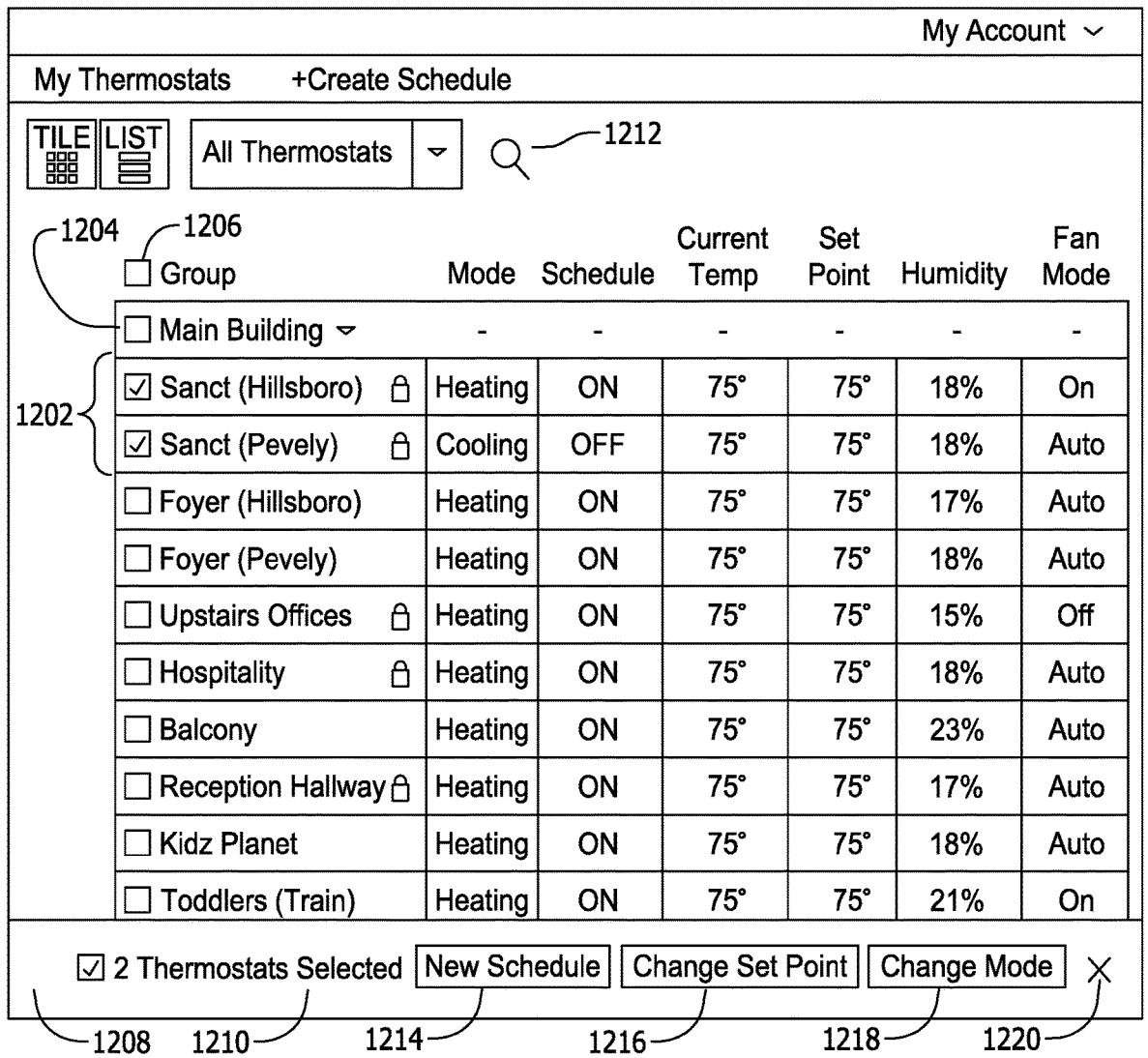
FIG. 12 is a list view of a multiple thermostat selection feature of a dashboard.

FIG. 12 is a list view 1200 of a multiple thermostat selection feature of a dashboard. When a user wishes to make changes to one or more thermostats, the user can select the desired thermostats individually 1202, by group with group select button 1204, or with check all button 1206. Action bar 1208 is displayed in response to thermostat selection. Action bar 1208 includes a number 1210 indicating how many thermostats have been selected, and further includes control options to be applied to the selected thermostats. Search bar 1212 can be used to search for other thermostats that the user wishes to add to the selection. Thermostats can be searched by name or by group. New schedule button 1214 can be selected to apply a new schedule to the selected thermostats. Change set point button 1216 can be selected to change the set point of the selected thermostats. Change mode button 1218 can be selected to change the operating mode of the selected thermostats. Cancel button 1220 will cancel the thermostat selection and removes action bar 1208 from the display. When no thermostats have been selected, or when selections have been cancelled using cancel button 1220, the list view 1200 resembles the list view dashboard 600.

Figure 13:
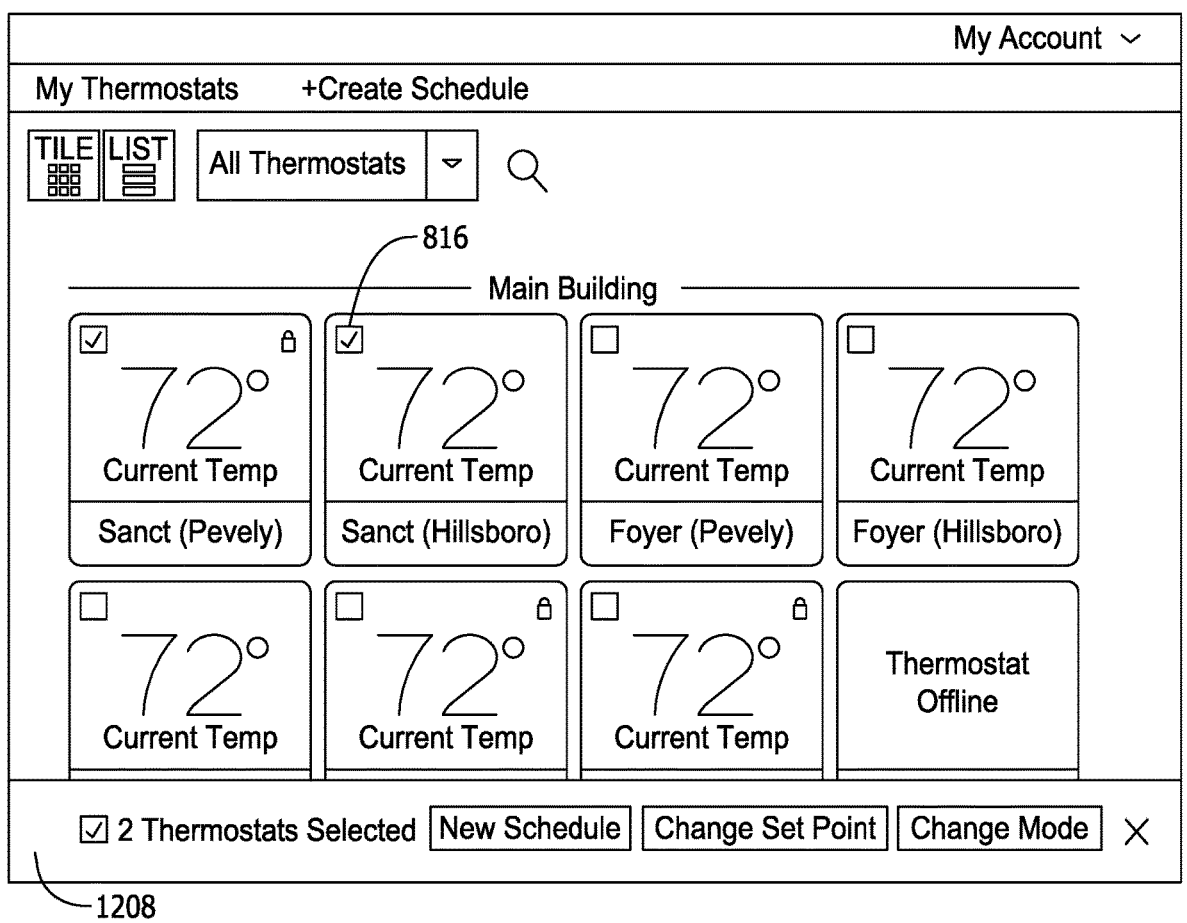
FIG. 13 is a card view of a multiple thermostat selection feature of a dashboard.

FIG. 13 is a card view 1300 of a multiple thermostat selection feature of a dashboard. When a user wishes to make changes to one or more thermostats, the user can select the desired thermostats individually using check box 816. Thermostats can also be selected with select group button or check all button (not shown). As with list view 1200, action bar 1208 is displayed in response to thermostat selection in card view 1300. When no thermostats have been selected, or when selections have been cancelled action bar 1208, the card view 1300 resembles the card view dashboard 500.

Figure 14:
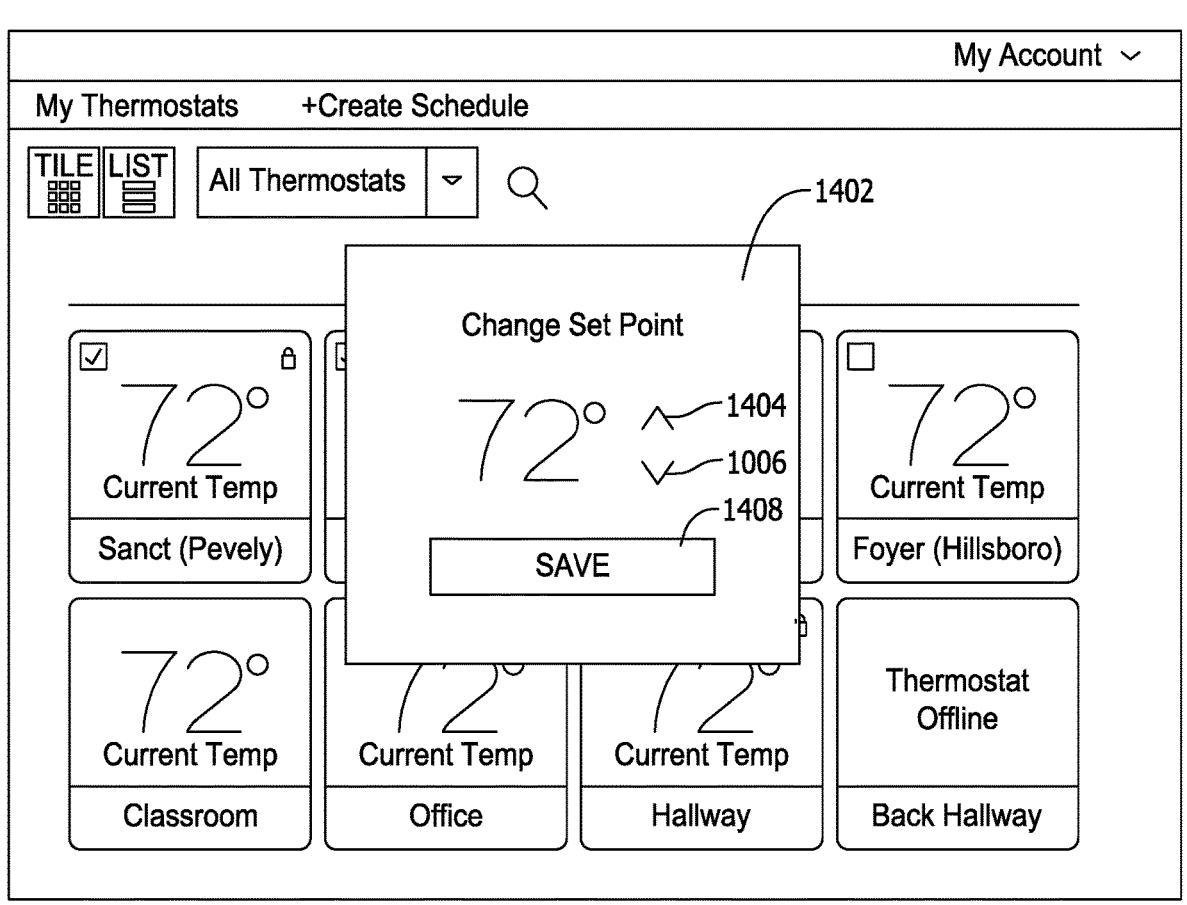
FIG. 14 is a card view of a change set point feature of a dashboard.

FIG. 14 is a card view 1400 of a change set point feature. When change set point button 1216 is selected from action bar 1208 in either list view 1200 or card view 1300, card view 1400 is displayed. Card view 1400 displays a current set point temperature 1402. Increase set point button 1404 or decrease set point button 1406 can be used to change the set point of the selected thermostats, according to user preference. Save button 1408 applies the new set point to the selected thermostats.

Figure 15:
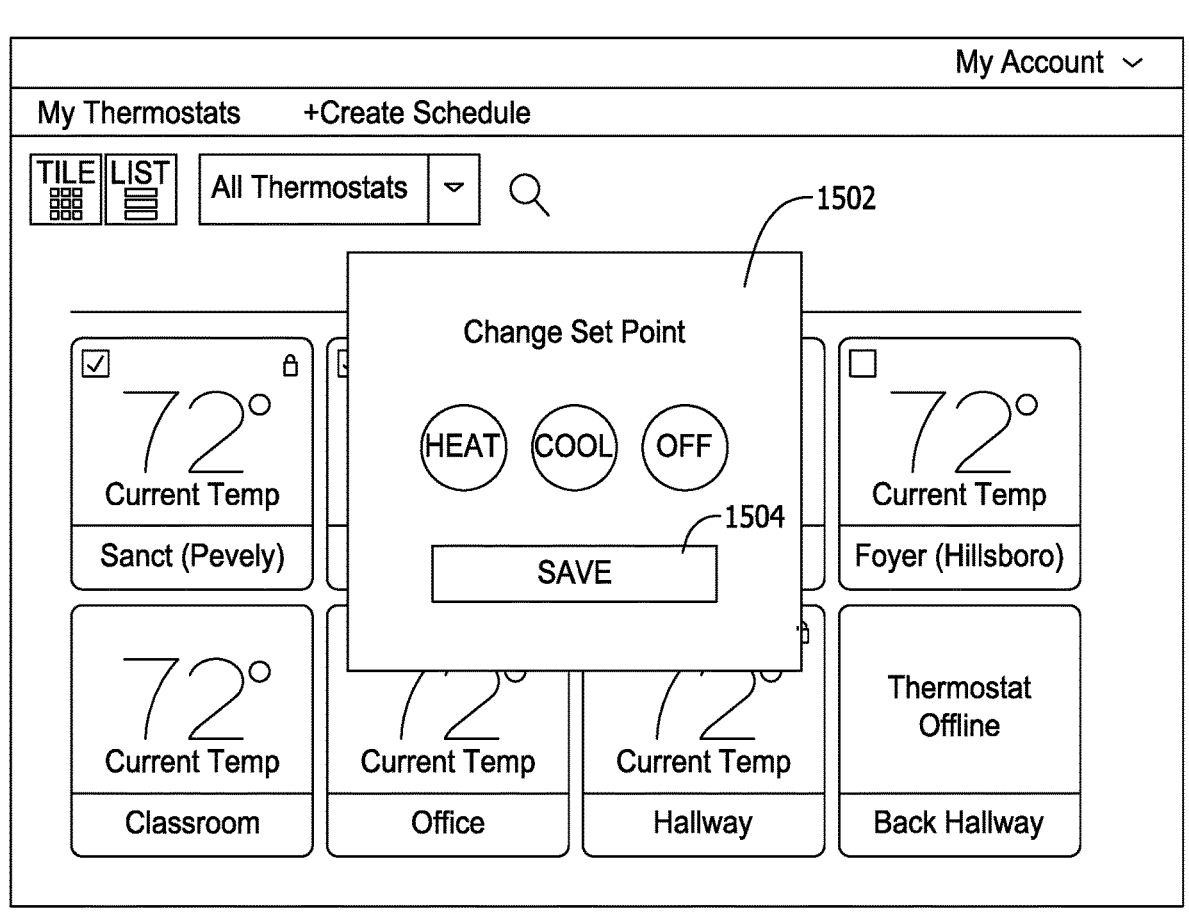
FIG. 15 is a card view of a set mode modal feature of a dashboard.

FIG. 15 is a card view 1500 of a set mode modal feature. When change mode button 1218 is selected from action bar 1208 in either list view 1200 or card view 1300, card view 1500 is displayed. Card view 1500 displays a current operating mode 1502. One of the other operating modes can be selected to change the operating mode of the selected thermostats. Save button 1504 applies the new operating mode to the selected thermostats. When the operating mode is changed, the applied operating schedule for each thermostat must change to the corresponding schedule for that mode. As stated above, a thermostat can have one heating operating schedule and one cooling operating schedule applied to it at any given time. If there is no schedule applied to a thermostat for the selected mode, then no schedule will run for that thermostat.

Figure 16A:
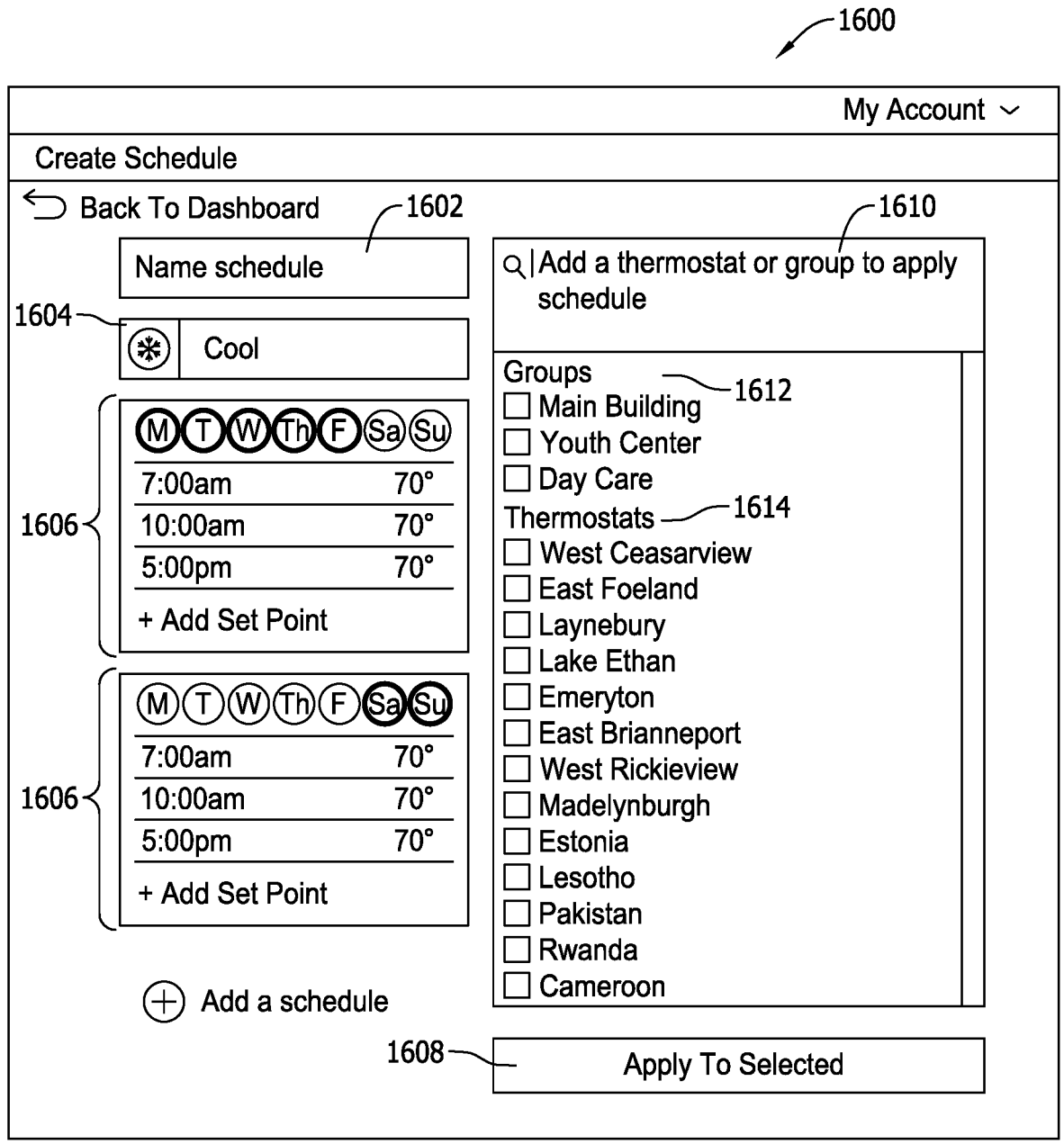
FIGS. 16a and 16b are create schedule views of a dashboard.
Figure 16B:
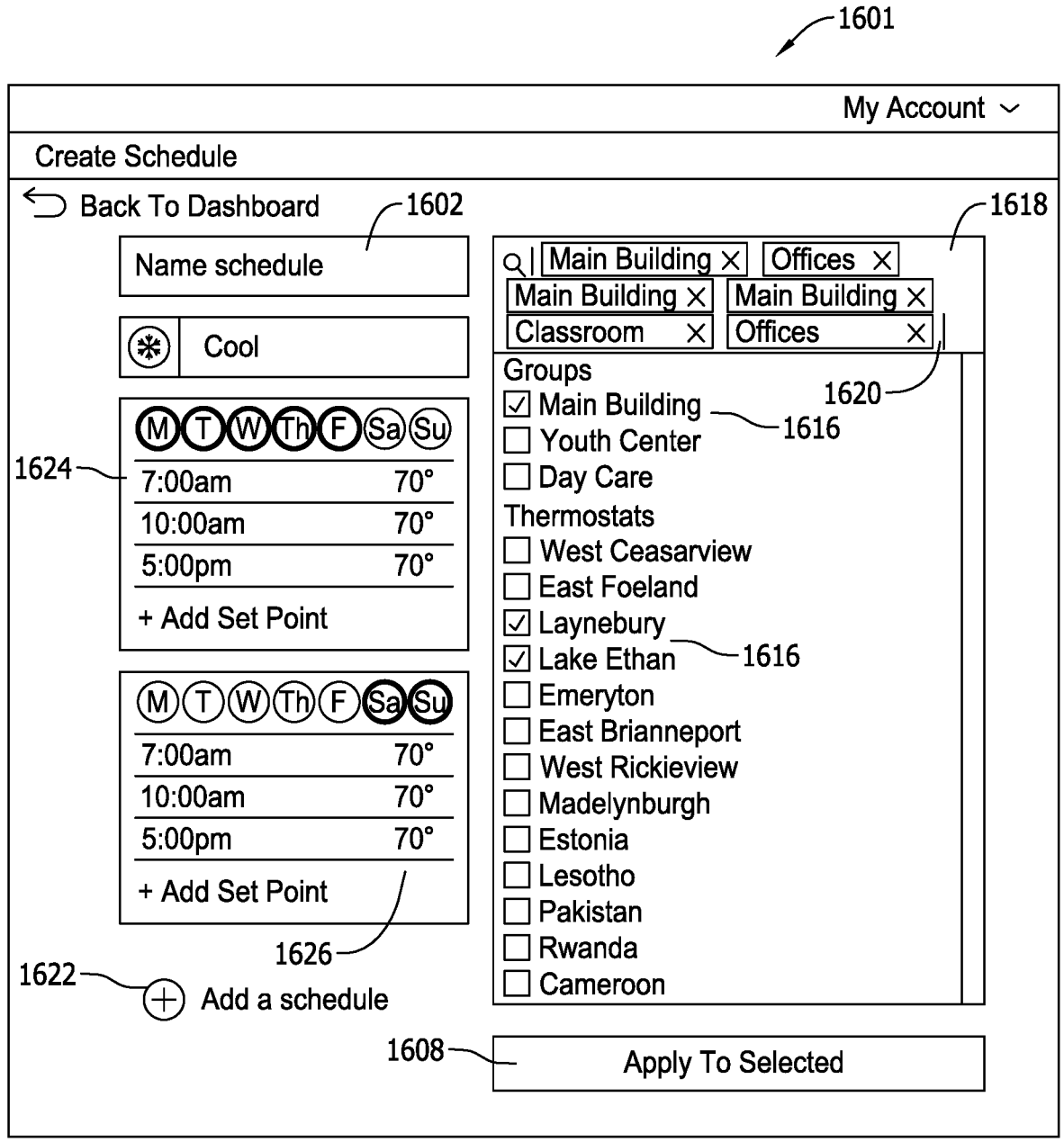

FIGS. 16a and 16b are create schedule views of a dashboard. With respect to FIG. 16a showing create schedule view 1600, name field 1602 allows a user to name the schedule being created. Each schedule must be named in order to save schedule settings and apply the schedule to a thermostat. Operating mode button 1604 indicates whether the schedule being created is a heating or a cooling schedule. Schedule blocks 1606 display editable times and set points for days of the week. A user can create up to seven schedule blocks 1606 within an overall schedule, i.e., a different schedule block 1606 for each day of the week. Alternatively, a user may select multiple days to be included in the same schedule block 1606, where scheduled times and corresponding set points for the selected days will be identical. Each schedule block must have at least one set point. Each day of the week must be selected in a schedule block 1606 for the schedule being created. If there are one or more days that are not selected, the user will not be allowed to save/apply the created schedule using apply button 1608. Search bar 1610 allows a user to search for thermostats to which the schedule will apply. Thermostats can be searched, displayed, and selected in create schedule view 1600 by thermostat name 1612 and group name 1614.

FIG. 16b is a create schedule view 1601, with selected thermostats 1616. A user must select at least one thermostat in order to save/apply the created schedule using apply button 1608. The user may apply the created schedule to as many thermostats as desired. The groups and individual thermostats that have been selected are shown as tags 1618. Create schedule view 1601 further includes text cursor 1620, which allows the user to continue searching with search bar 1610 and adding thermostats to the selection. Additional schedule blocks 1606 may be added to the overall schedule using add button 1622. Within each schedule block 1606, times 1624 must be selected at 15 minute increments (e.g., 12:00 pm, 12:15 pm, 12:30 pm, and 12:45 pm). At each scheduled time 1624, a set point 1626 must be chosen in the range of 45-99 degrees Fahrenheit.

Figure 17:
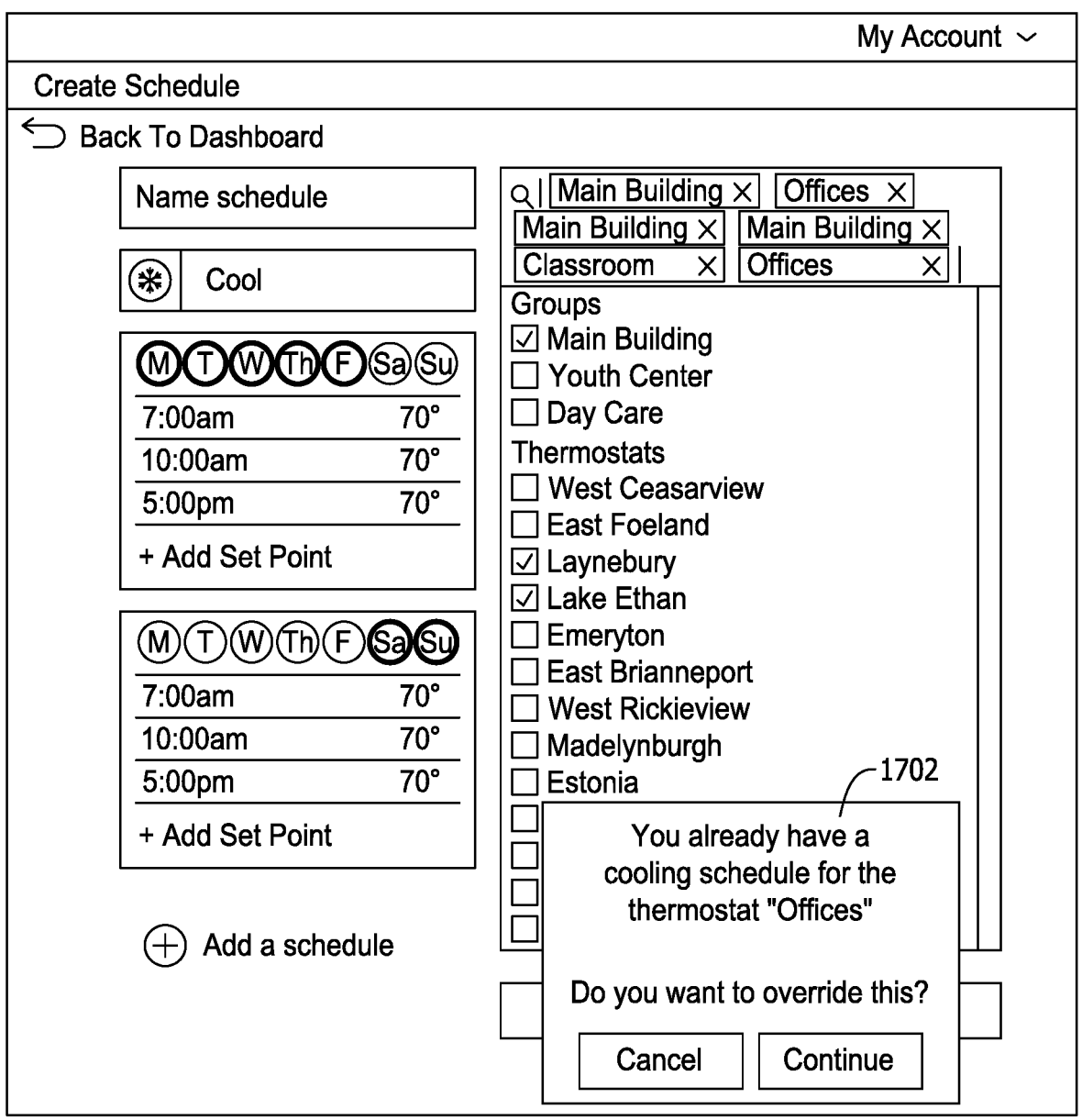
FIG. 17 is a schedule override alert view of a dashboard.

FIG. 17 is a schedule override alert view 1700 of a dashboard. For example, if a user wishes to apply a new cooling schedule to a thermostat that already has an assigned cooling schedule, the user will be notified with an override alert 1702. The override alert 1702 notifies the user that the new schedule will override the previous schedule. If the thermostat belongs to a schedule group, it is removed from the schedule group, a new schedule group is created for the new schedule, and the thermostat is placed in the new schedule group. In other embodiments, the thermostat is removed from the schedule group and placed in an unassigned group. If the thermostat belongs to a location group rather than a schedule group, overriding a schedule doesn't alter the group to which it belongs. In some embodiments, the previous schedule will be deleted. In other embodiments, such as when the previous schedule is still applied to other thermostats, the previous schedule may not be deleted. The user can confirm or cancel the override. An override alert 1702 will also be displayed to a user in embodiments when the user wishes to activate a cooling schedule for a thermostat that is currently running on a heating schedule.

Embodiments of the methods and systems described herein achieve a more intuitive grouping interface and user friendly experience compared to prior methods and systems. The example control system with drag and drop functionality allows a user to easily group and manage a large number of thermostats according to user preference. The system allows users to group thermostats according to building, or rooms within a building. Users may monitor and sort thermostats and groupings by state (active, heating, cooling, inactive, offline). The systems save energy (10-30%, based on government data) by programming rooms on a schedule. Improved comfort and indoor air quality profiles are achieved through better, easier management of thermostats using the control systems of this disclosure. The systems also allow management of variable occupancy schedules (events, meetings, et cetera) and provide similar functionality as a building automation platform. The example system alerts users to offline or incapacitated thermostats and affords facilities and facility management to federate control on a per-room, per-thermostat basis for better security. The systems allow users to enable keypad lockout quickly and easily on thermostats.

Example embodiments of systems and methods for controlling a plurality of thermostats are described above in detail. The system is not limited to the specific embodiments described herein, but rather, components of the system may be used independently and separately from other components described herein. For example, the server and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A method of managing a plurality of thermostats associated with an account using a computing device, the method comprising:

storing a respective heating operating schedule and a respective cooling operating schedule in a memory device of a server associated with each of the plurality of thermostats, the heating and cooling operating schedules selectable by a user, the heating and cooling operating schedules including temperature or humidity set points with respect to time used to control an operation of associated heating and cooling equipment, the plurality of thermostats capable of responsively initiating operation of the heating or cooling equipment based on the heating or cooling operating schedule when a sensed temperature at the thermostat is more than a predetermined amount above or below a set point temperature associated with the respective thermostat;

displaying, on a display device of the server, a visual representation for each thermostat of the plurality of thermostats associated with the account, the visual representation including a display of a current temperature setpoint of the thermostat and a display of a current temperature sensed by the thermostat at a thermostat location;

creating a visual representation of a first group of thermostats in response to a first user selection to create a group, the first group capable of receiving visual representations of thermostats assigned to the first group and receiving the heating and cooling operating schedules including temperature or humidity set points to be assigned to thermostats in the first group;

assigning a first operating schedule to the first group in response to a user selection of a first operating schedule for the first group;

transmitting the first operating schedule over a network to thermostats included in the first group for reprogramming and storing in the memory device of the thermostats included in the first group;

after the thermostats in the first group are reprogrammed to all have the same first operating schedule associated with the first group, adding a first thermostat of the plurality of thermostats to the first group in response to the user dragging and dropping the visual representation of the first thermostat of the plurality of thermostats into the visual representation of the first group;

applying the first operating schedule to the first thermostat while maintaining the first operating schedule as assigned to the first group, such that an operating schedule of the first thermostat is changed to match the first operating schedule of the other thermostats in the first group based on the dragging and dropping the visual representation of the first thermostat of the plurality of thermostats into the visual representation of the first group; and controlling the operation of the heating or cooling equipment associated with the first thermostat based on the temperature or humidity set points of the applied first operating schedule.

2. The method of claim 1, wherein displaying a visual representation for each thermostat of the plurality of thermostats comprises displaying a list item.

3. The method of claim 1, wherein displaying a visual representation for each thermostat of the plurality of thermostats comprises displaying a card icon.

4. The method of claim 3, wherein displaying a card icon comprises displaying at least one of a name of the thermostat, a set-point of the thermostat, and a type of operating schedule assigned to the thermostat.

5. The method of claim 3, wherein displaying a card icon comprises displaying a color-coded card icon according to one of a heating schedule assignment, a cooling schedule assignment, an un-scheduled assignment, or an offline designation.

6. The method of claim 1, further comprising transmitting the operating schedule over a network to the first thermostat for reprogramming and storing in a memory of the first thermostat.

7. The method of claim 1, further comprising:

creating a second group in response to a second user selection to create a group;

adding a second thermostat of the plurality of thermostats to the second group in response to the user dragging and dropping the visual representation of the second thermostat into the visual representation of the second group;

assigning a second operating schedule to the second group in response to a user selection of a second operating schedule for the second group; and applying the second operating schedule to the second thermostat based on the inclusion of the second thermostat in the second group.

8. The method of claim 7, further comprising transmitting the second operating schedule over a network to the second thermostat for reprogramming and storing in a memory of the second thermostat.

9. A control system for controlling operation of a plurality of thermostats, the system comprising:
   a server comprising:
      a processor;
      a memory; and
      a communication interface; and
   a memory device storing instructions that when executed by the processor cause the processor to:
      store at least one of a respective heating operating schedule and a respective cooling operating schedule in a memory device of the server associated with each of the plurality of thermostats, the heating and cooling operating schedules including set points used to control an operation of associated heating and cooling equipment;
      display, on a display device of a computing device, a visual representation for each thermostat of the plurality of thermostats associated with an account, the visual representation including a display of a current temperature setpoint of the thermostat and a display of a current temperature sensed by the thermostat at a thermostat location;
      create a first group in response to a first user selection to create a group;
      assign a first operating schedule of the at least one of a respective heating operating schedule and a respective cooling operating schedule to the first group in response to a user selection of a first operating schedule for the first group;
      transmit the first operating schedule over a network to thermostats included in the first group for reprogramming and storing in the memory device of the thermostats included in the first group;
      after the thermostats in the first group are reprogrammed to all have the same first operating schedule associated with the first group, add a first thermostat of the plurality of thermostats to the first group in response to the user dragging and dropping the visual representation of the first thermostat of the plurality of thermostats into a visual representation of the first group; and
      apply the first operating schedule to the first thermostat while maintaining the first operating schedule as assigned to the first group, such that an operating schedule of the first thermostat is changed to match the operating schedule of the other thermostats in the first group based on the dragging and dropping the visual representation of the first thermostat of the plurality of thermostats into the visual representation of the first group.

10. The control system of claim 9, wherein the displayed visual representation for each thermostat of the plurality of thermostats is a list item.

11. The control system of claim 9, wherein the displayed visual representation for each thermostat of the plurality of thermostats is a card icon.

12. The control system of claim 9, wherein the memory device storing instructions that when executed by the processor cause the processor further to:
   create a second group in response to a second user selection to create a group;
   add a second thermostat of the plurality of thermostats to the second group in response to the user dragging and dropping the visual representation of the second thermostat into the visual representation of the second group;
   assign a second operating schedule to the second group in response to a user selection of a second operating schedule for the second group; and
   apply the second operating schedule to the second thermostat based on the inclusion of the second thermostat in the second group.

13. The control system of claim 9, wherein the memory device storing instructions that when executed by the processor cause the processor further to display, on the display device of the computing device, thermostat data in association with the visual representation of each of the plurality of thermostats.

14. The control system of claim 13, wherein the displayed thermostat data includes at least one of a name of the thermostat, an on/off status, a current temperature, a type of assigned operating schedule, a percent humidity, and a fan mode.

* * * * *